US012327309B2

(12) United States Patent
Detert et al.

(10) Patent No.: US 12,327,309 B2
(45) Date of Patent: Jun. 10, 2025

(54) SYSTEMS AND METHODS FOR AREA WIDE OBJECT DIMENSIONING

(71) Applicant: Illinois Tool Works Inc., Glenview, IL (US)

(72) Inventors: Kevin Detert, Fairmont, MN (US); Brian Hackett, Fairmont, MN (US); Eric Holland, Lake Crystal, MN (US); Jeremiah Pluim, Fairmont, MN (US)

(73) Assignee: Illinois Tool Works Inc.

( * ) Notice: Subject to any disclaimer, the term of this patent is extended or adjusted under 35 U.S.C. 154(b) by 96 days.

(21) Appl. No.: 17/689,228

(22) Filed: Mar. 8, 2022

(65) Prior Publication Data
US 2022/0301260 A1 Sep. 22, 2022

Related U.S. Application Data

(60) Provisional application No. 63/161,655, filed on Mar. 16, 2021.

(51) Int. Cl.
*G06T 17/00* (2006.01)
*G01S 19/26* (2010.01)
*G06T 7/50* (2017.01)
*G06T 7/62* (2017.01)
(Continued)

(52) U.S. Cl.
CPC .............. *G06T 17/00* (2013.01); *G01S 19/26* (2013.01); *G06T 7/50* (2017.01); *G06T 7/62* (2017.01); *G06V 20/56* (2022.01); *G06T 2200/08* (2013.01); *G06T 2207/30252* (2013.01)

(58) Field of Classification Search
CPC ..... G01S 19/26; G06T 17/00; G06T 2200/08; G06T 2207/30252; G06T 7/50; G06T 7/62; G06V 20/56
See application file for complete search history.

(56) References Cited

U.S. PATENT DOCUMENTS

2005/0240317 A1 10/2005 Kienzle-Lietl
2006/0092043 A1\* 5/2006 Lagassey ............. G07C 5/0891
340/907
(Continued)

FOREIGN PATENT DOCUMENTS

EP 3751518 12/2020

OTHER PUBLICATIONS

Int'l Search Report and Written Opinion ApplN No. PCT/US2022/019451 mailed Jun. 2, 2022.

*Primary Examiner* — Sing-Wai Wu
(74) *Attorney, Agent, or Firm* — MCANDREWS HELD & MALLOY LTD.

(57) ABSTRACT

The present disclosure provides an area wide object dimensioning system for an object in motion, such as mounted to a vehicle (e.g., a lift truck). One or more sensors (e.g., a radar system, an acoustic sensor, an image capture system, a LIDAR system, a microwave system, etc.) are located within the area to capture data corresponding to one or more dimensions of the object as it travels through the area. Control circuitry receives the data from the sensors, which is converted into multiple dimensions corresponding to one or more surfaces of the object. Surface dimensions are employed to determine a shape, volume, orientation, or area of the surfaces of the object, and/or the object itself, based on the multiple surface dimensions.

20 Claims, 5 Drawing Sheets

(51) Int. Cl.
    *G06V 20/52*    (2022.01)
    *G06V 20/56*    (2022.01)

(56) References Cited

U.S. PATENT DOCUMENTS

| | | | |
|---|---|---|---|
| 2013/0083964 A1* | 4/2013 | Morris | G01S 7/4808 |
| | | | 382/103 |
| 2017/0068756 A1* | 3/2017 | Wilsher | G06F 30/15 |
| 2017/0268912 A1* | 9/2017 | Talbot | G01B 11/14 |
| 2018/0143003 A1 | 5/2018 | Clayton | |
| 2019/0194005 A1 | 6/2019 | Shah | |
| 2021/0350496 A1* | 11/2021 | Carey | G06T 1/0014 |
| 2021/0368310 A1* | 11/2021 | Hareuveni | G08G 1/01 |

* cited by examiner

SYSTEMS AND METHODS FOR AREA WIDE OBJECT DIMENSIONING

CROSS-REFERENCE TO RELATED APPLICATIONS

This application hereby claims priority to and the benefit of U.S. Provisional Application Ser. No. 63/161,655, entitled "SYSTEMS AND METHODS FOR AREA WIDE OBJECT DIMENSIONING," filed Mar. 16, 2021. U.S. Provisional Application Ser. No. 63/161,655 is hereby incorporated by reference in its entireties for all purposes.

BACKGROUND

Vehicles such as lift trucks can be configured to support loads of varying sizes and shapes. For example, a lift truck may transport an object within a warehouse or other area. However, issues exist with carriage or loading of different objects, such as complications with securing and/or arranging multiple objects of different shapes on the lift truck and/or in a storage area. Some of these issues result from a lack of information regarding object dimensions.

Accordingly, there is a need for an area wide dimensioning system that determines a shape of a loaded object in movement.

SUMMARY

Disclosed is an area wide object dimensioning system for an object in motion, such as mounted to a vehicle (e.g., a lift truck). One or more sensors are located within the area to capture data corresponding to one or more dimensions of the object as it travels through the area. Control circuitry receives the data from the sensors, which is converted into multiple dimensions corresponding to one or more surfaces of the object. Surface dimensions are employed to determine a shape, volume, orientation, or area of the surfaces of the object, and/or the object itself, based on the multiple surface dimensions.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1A:
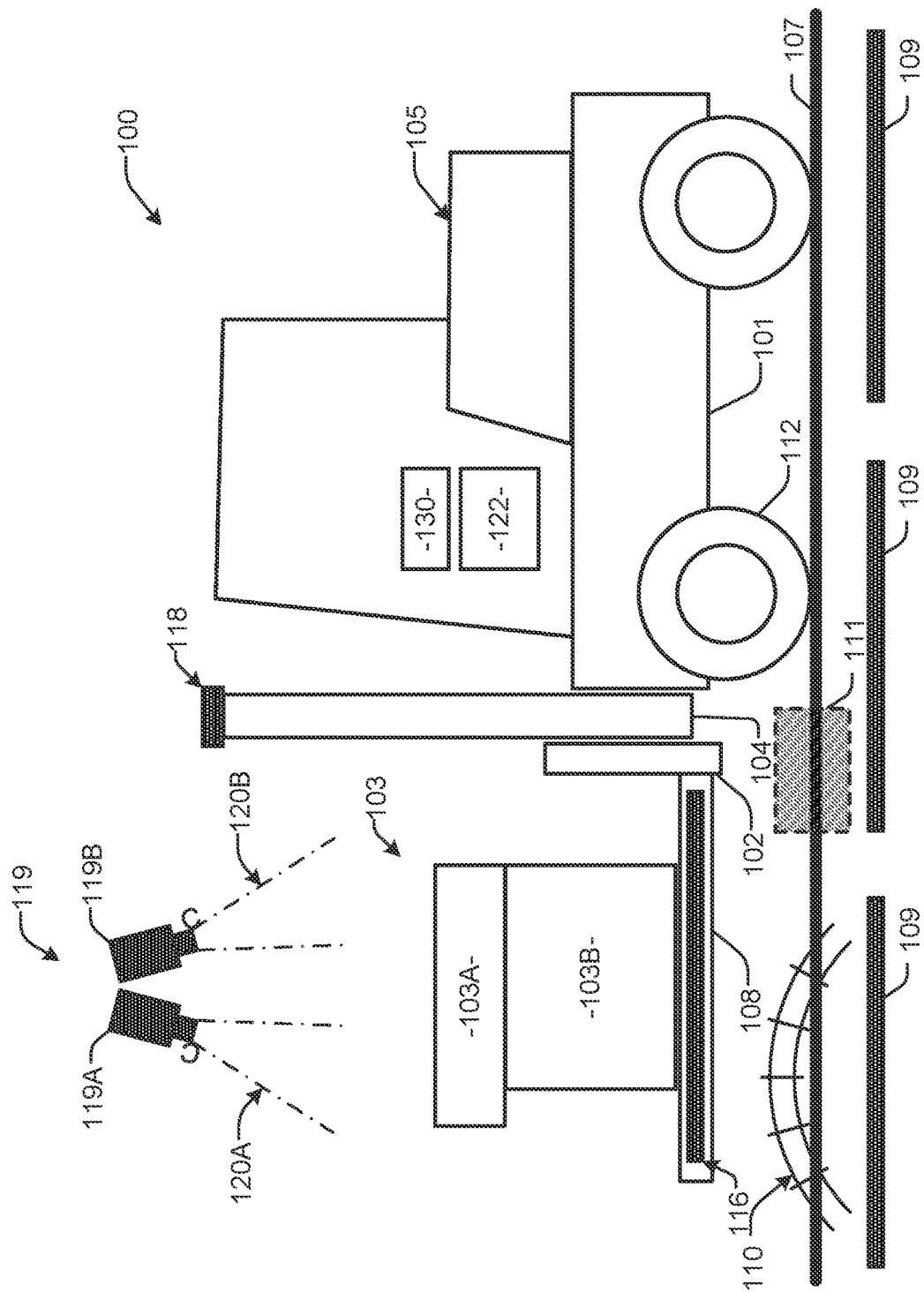
FIG. 1A is a diagrammatic illustration of an example object dimensioning system for a predetermined area, in accordance with aspects of this disclosure.

The present disclosure describes an area wide object dimensioning system for an object in motion, such as mounted to a vehicle (e.g., a lift truck). One or more sensors (e.g., a radar system, an acoustic sensor, an image capture system, a LIDAR system, a microwave system, etc.) are located within the area to capture data corresponding to one or more dimensions of the object as it travels through the area. For example, a first sensor can be arranged at a first location of the area, configured to capture data corresponding to one or more features of the object as the object moves through the area. A second sensor can be arranged at a second location of the area, configured to capture data corresponding to the same or different features of the object. The features may include size, shape, angle, or orientation of the object.

Control circuitry receives the data from the sensors, which is converted into multiple dimensions corresponding to one or more surfaces of the object. Surface dimensions are employed to calculate, estimate, and/or otherwise determine a shape, volume, orientation, or area of the surfaces of the object, and/or the object itself, based on the multiple surface dimensions.

The control circuitry may also receive location data of the object or the vehicle from a tracking device mounted to or otherwise associated with the vehicle or the object.

Based on vehicle and/or object location data, and/or measurements from the sensors, the system can determine one or more of a speed, a trajectory, or a path of the vehicle. For example, if the path of the moving object is predetermined, the system may alert another sensor down the path to the pending arrival of the object. Thus, the other sensors may prepare to capture data of the object, such as reorienting to meet the object.

In some examples, the sensors monitor or otherwise collect data corresponding to the tracking device, such as identifying an indicator of the tracking device (e.g., a marker), whereas in some examples the tracking device generates a signal indicating position (e.g., a beacon).

In some examples, one of the first or the second sensor is mounted to the vehicle, and/or data captured from a vehicle mounted sensor can be employed to determine the object dimensions and/or an associated model.

In some examples, dimensions of the object are determined based on a calculation, estimation, and/or determination of one or more endpoints of each of the surfaces (e.g., based on the data corresponding to the features). For example, the endpoints may correspond to portions of the surfaces that extend farthest in any given direction. The system determines a location of a greatest endpoint in one or more axes. At the endpoints, a plane can be generated (e.g., in a digital model) corresponding to each of six sides of a cuboid based defined by the endpoint that extends the greatest distance at each side. Based on the location of the endpoints and corresponding plane, a shape, volume, orientation, or area of the cuboid can be created, such as in a digital model, image, etc.

Palletized freight and non-palletized freight, carried on a vehicle such as a forklift truck, can have uneven shapes and/or protrusions resulting in uneven surfaces. Moreover, these uneven surfaces take up space in storage and/or a trailer. However, within many areas, such as a warehouse, measuring, calculating, and/or otherwise determining dimensions of the object is challenging due to limited space, numerous obstacles, and/or nearby traffic, for example. To overcome such challenges, conventional systems have employed complicated sensors and/or routines, challenging efficiencies for storage and/or transport of freight, as those systems employ stationary measuring equipment located in dedicated areas, requiring vehicles to travel to such areas for dimensioning. For instance, conventional systems employ sensors focused on a small, designated area, which requires the object to be brought to the specific location and remain static during a measurement process.

By contrast, the disclosed example area wide dimensioning system provides advantages over conventional object measurement systems. For example, an area wide dimensioning system allows for optimization of space, movement, and/or timing based on sensing and/or dimensioning technologies. The disclosed area wide dimensioning system is configured to track the object and/or vehicle, and capture data corresponding to one or more of dimensions, shape, volume, orientation, or area of the object, whether the object is stationary or in motion. Further, the sensors are configured to capture object data from multiple perspectives, such that a composite model and/or image can be created from each perspective or a combination of the multiple perspectives.

Accordingly, the disclosed examples provide an area wide dimensioning system with increased flexibility and applicability, while allowing for movement of the object within the area. As a result, warehousing and/or loading of freight or other objects may realize increase efficiencies, such as a reduction of transport routes and optimization of trailer space.

Further, by expanding the amount and/or type of objects available for dimensioning (without requiring dimensioning in a single, static location), errors associated with estimating the size and/or shape of the objects can be reduced or eliminated. As a result, placement in storage and/or transport containers can be optimized to remove or eliminate valuable unused space. Moreover, as object tracking and/or transport billing is often tied to object size (and the amount of space needed for such storage and/or transport), the ability to more readily and/or more accurately determine object dimensions increases the availability and/or accuracy of sales and/or billing.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "first" and "second" may be used to enumerate different components or elements of the same type, and do not necessarily imply any particular order.

As used herein the terms "circuits" and "circuitry" refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller.

In the drawings, similar features are denoted by the same reference signs throughout.

Turning now to the drawings, FIG. 1A illustrates a side view of an example area wide dimensioning system 100, in accordance with aspects of this disclosure. In the example of FIG. 1A, the system 100 employs a vehicle 105, which includes one or more of a lift truck carriage 104, a lift truck carriage mount 102, and one or more forks or load handling fixtures 108 to support and/or manipulate a load. A chassis 101 supports the vehicle components via one or more wheels 112. An operator can command the lift truck attachment system 100 to perform an object dimensioning operation, while controlling the system to raise, lower, and/or manipulate the object, freight, and/or load 103.

In some examples, a control circuitry or system 122 is included and configured to control one or more components of the system to implement one or more of monitoring, measuring, analyzing, and/or generating an output corresponding to a dimensioning operation. The control circuitry 122 may contain a processor 150, memory storage device 156, one or more interfaces 154, a communications transceiver 152, an energy storage device 160, and/or other circuitry (e.g., control system 164) to control the system 100 (see, e.g., FIG. 4). In some examples, the system 100 is powered by one or more of batteries, an engine, solar or hydrogen cell, and/or mains power, as a non-limiting list of examples. In some examples, one or more of the system components (e.g., sensors 116, 118) are provided power via electrical conductors and/or wireless power coupling (e.g., inductive power transmission).

The system 100 can include one or more sensors configured to sense, monitor, and/or measure one or more dimensions of the object 103. As shown in the example of FIG. 1A, a first sensor 116 is arranged, embedded, incorporated, or otherwise associated with load handling fixtures 108. A second sensor 118 is arranged, embedded, incorporated, or otherwise associated with the mast 104. Although illustrated in example FIG. 1A as being located in particular positions on the vehicle 105, one or both of the sensors 116, 118 may be arranged on another structures of the vehicle, such as the carriage 102, the chassis 101, the cab 107, as a list of non-limiting examples. Further, although illustrated as including two sensors 116, 118, each sensor may comprise two or more sensors, one or more additional sensors may be added, or a single sensor may be employed.

Moreover, a dimensioning operation may incorporate data from sensors external to the system 100. As shown, the sensors 119A, 119B are arranged above or otherwise around the object 103 and/or vehicle. Sensors 109 are arranged below the object 103 and/or vehicle. In additional or optional examples, one or more sensors 111 can be included to extend from a surface 107 and/or other structure (e.g., wall, pillar, etc.), either retractable or fixed, to capture additional data as an object/vehicle moves by. Although illustrated examples represent the various sensors in a particular location, arrangement, or number, the various sensors may be arranged in any location or orientation within the area, and in any number to support a given dimensioning operation.

Some example sensors 119A, 119B (e.g., as well as example sensors 111, 118,) can be configured to capture data within a field of view or line of sight with the object, represented by example lines 120A, 120B, respectively. The sensors can be one or more of image capture devices, such as a vision based camera, infrared camera, or a laser detector, as a list of non-limiting examples. In some examples, sensors 119A, 119B are a common type of sensor (e.g., vision image capture), whereas in other examples they are different types of sensors (e.g., an infrared sensor).

Some example sensors 109 (e.g., as well as example sensors 111, 116,) can include one or more of a radar system, an acoustic sensor, an image capture system, a laser based system, an acoustic sensor, a light detection and ranging (LIDAR) system, a microwave system, etc.

In some examples, the sensors 109 are radar or acoustic sensors which, when activated, generates a signal(s) 110, which provides a feedback signal(s) following reflection from the object 103. Example signal(s) 110 may include a point cloud, ranging signal, 3D scanning laser, single and/or multi-wavelength electromagnetic waves (e.g., visible light, infrared light, microwaves, etc.), and/or any other signals. In this manner, the sensors 109 capture data corresponding to dimensions of the object without the need for line-of-sight imaging.

During a dimensioning operation, one or more of the sensors (e.g., 109, 111, 116, 118 119A, 119B) are activated, capturing measurements and/or data associated with one or more dimensions (e.g., length, width, angle, etc.) of one or more surfaces of the object 103. The data corresponding to the dimension measurements (and/or location of the respective sensors) are transmitted (via wired and/or wireless communications) to the control circuitry 122 for analysis.

The control circuitry 122 may be configured to receive data (e.g., dimensions, measurements) from the sensors (e.g., 109, 111, 116, 118 119A, 119B), such as by a digital and/or analog data signal. The control circuitry 122 is configured to calculate, estimate, and/or otherwise determine one or more dimensions (e.g., shape, volume, orientation, size, area, etc.) of one or more surfaces of the object 103 based on the data. Once dimensions of the object surfaces have been determined, the control circuitry 122 is further configured to calculate, estimate, and/or otherwise determine one or more dimensions (e.g., shape, volume, orientation, size, area, etc.) of the object based on the determined of the one or more surfaces.

A dimensioning operation may be performed when the object 103 moves into range of the sensors, whether stationary and/or in motion. The system 100 can continually or periodically update the sensor data, such as during a loading or unloading operation, and/or in response to an operator command.

Figure 1B:
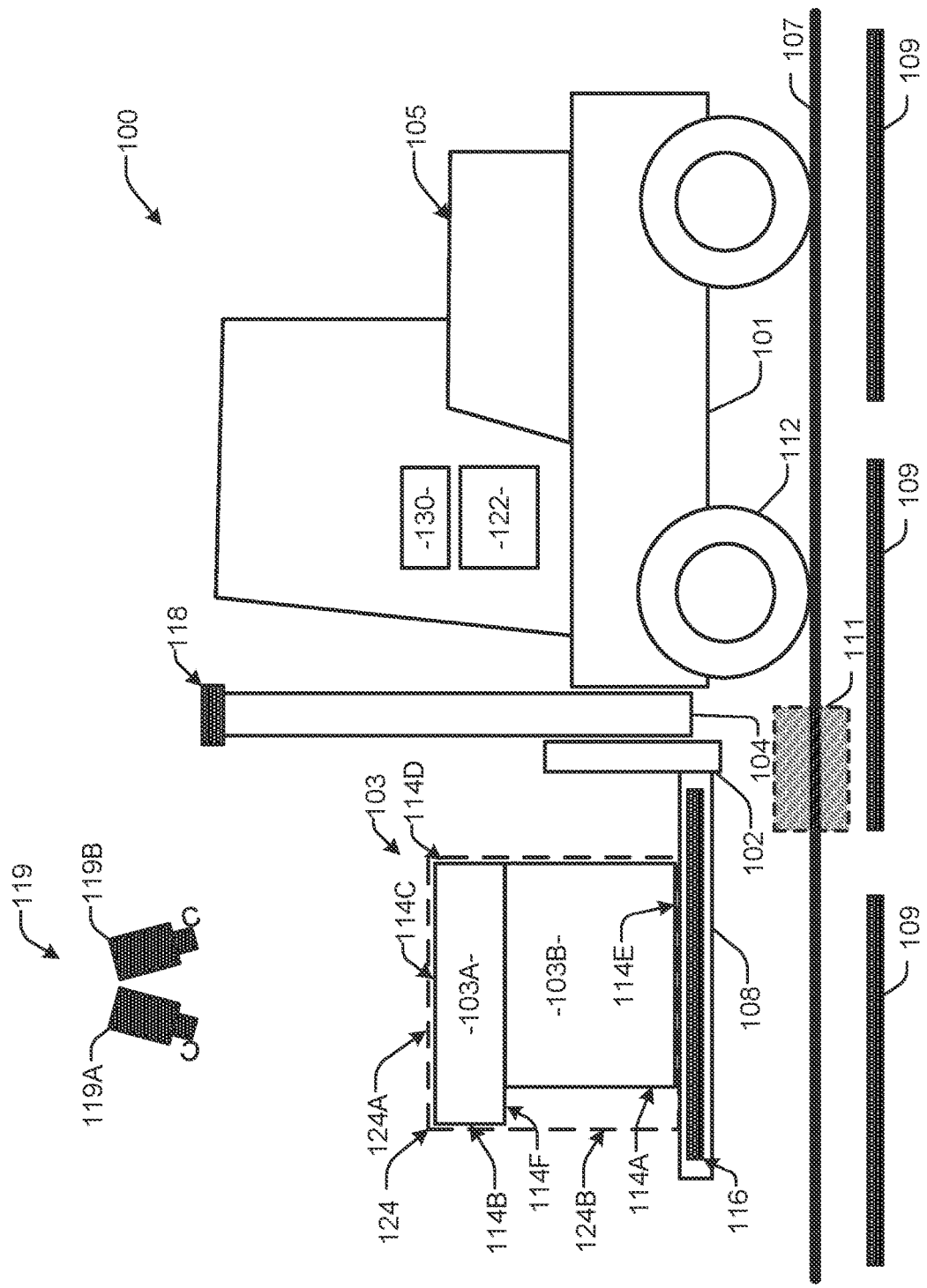
FIG. 1B is a diagrammatic illustration of an example implementation of the example object dimensioning system of FIG. 1A, in accordance with aspects of this disclosure.

Turning now to FIG. 1B, a load 103 is arranged on the load handling fixtures 108, the load 103 including a first object 103A with a first set of dimensions and a second object 103B with a second set of dimensions. One or more of the sensors 109, 111, 116, 118 119A, 119B have been activated to perform a dimensioning operation as the object 103 moves through the area.

In the example of FIG. 1B, sensors 119A, 119B capture image, laser, and/or other data from one or more perspective, providing multiple sets of dimensioning data. For example, surface 114C may be fully imaged, surfaces 114B and 114D may be partially or completely imaged, whereas surfaces 114A, 114E and 114F are partially or completely obscured.

In some additional or alternative examples, sensors 109 may be employed to collect dimensioning data. Sensors 109 may be radar, such that radio waves are transmitted toward the load 103 via a transmitter and/or transceiver. A feedback wave is reflected back to the sensor 109 (e.g., an antenna and/or transceiver) from surfaces 114E and 114F with a plurality of signal characteristics corresponding to the dimensions thereof. The plurality of signal characteristics may include one or more of a frequency, a signal strength, signal time of flight, Doppler shift, angle of arrival, signal polarization, or a change thereof, for instance. Data collected by the sensors 109 indicate the first object 103A has a surface with a first set of dimensions, and second object 103B has a second set of dimensions. For example, the sensors 109 data indicates objects 103A and 103B share a common right side at surface 114D, whereas surfaces 114A and 114B are not aligned.

In an example employing a radar enabled sensor, the data may include a plurality of signal characteristics corresponding to dimensions of the surfaces, such as a frequency, a signal strength, signal time of flight, Doppler shift, angle of arrival, signal polarization, or a change thereof. Data processing (e.g., at the control circuitry 122 and/or the processor 150) will provide compensation for time, movement, angular orientation, extrapolation of surface dimensions, via one or more algorithms to calculate, estimate, and/or determine the dimensions of the object 103. Further, the antenna or transceiver of the sensor 109 can be tuned to ensure the data collected is limited to object dimensions rather than environmental features (e.g., personnel, walls, pillars, other vehicles, objects, etc.).

The control circuitry 122 is configured to generate a model representing a composite of available data from each of the sensors 109, 119A, 119B (and/or sensor 111, vehicle mounted sensors 116, 118), such as by mapping the data by compiling and arranging the surfaces to form the model. The data can be compiled with reference to one or more parameters, including time, a common reference (e.g., identifiable structural feature of the object, fiducial marker, watermark, etc.), and/or a known dimension of a surrounding feature (e.g., the load handling fixtures), as a list of non-limiting examples.

Following a dimensioning operation, the model generated via the collected data is represented as a virtual cuboid 124 with dimensions 124A and 124B. The dimensions of the cuboid 124 reflect the longest endpoints along each axis (e.g., along six sides of the cube). The dimensions of the cuboid model 124 can be transmitted to a remote system (e.g., remote computer 166 of FIG. 4), which may be used to calculate arrangement for storage of freight in a warehouse, container, vehicle, etc. Although represented as a cuboid, the model may have any dimensions and/or geometry, including complex geometries.

Although FIGS. 1A and 1B provide an example side perspective of the system 100 and object 103, the sensing technologies and/or dimensioning operation may be implemented to measure multiple surfaces and/or perspectives relative to the object 103.

In some examples, the control circuitry 122 may be configured to generate an alert signal in response to a particular determination, such as a volume of the object 103 exceeds one or more threshold values (e.g., length, width, shape, etc.). The alert may be transmitted to an operator facing device (e.g., a user interface, a remote computer or controller, etc.) which provides an indication of the determination. In some examples, threshold values, the listing of values, and/or distribution plan data 158 are stored in the memory storage device 156, accessible to the processor 150 for analysis.

In some examples, devices and/or components (not shown) may be connected to provide signals corresponding to the output from the sensors for analysis, display, and/or recordation, for instance.

Although some examples are represented as fork lift trucks, the concepts disclosed herein are generally applicable to a variety of vehicles (e.g., lorries, carts, etc.) and/or lift modalities (e.g., "walkie stackers," pallet jacks, etc.) to determine dimensions of a load.

Figure 2:
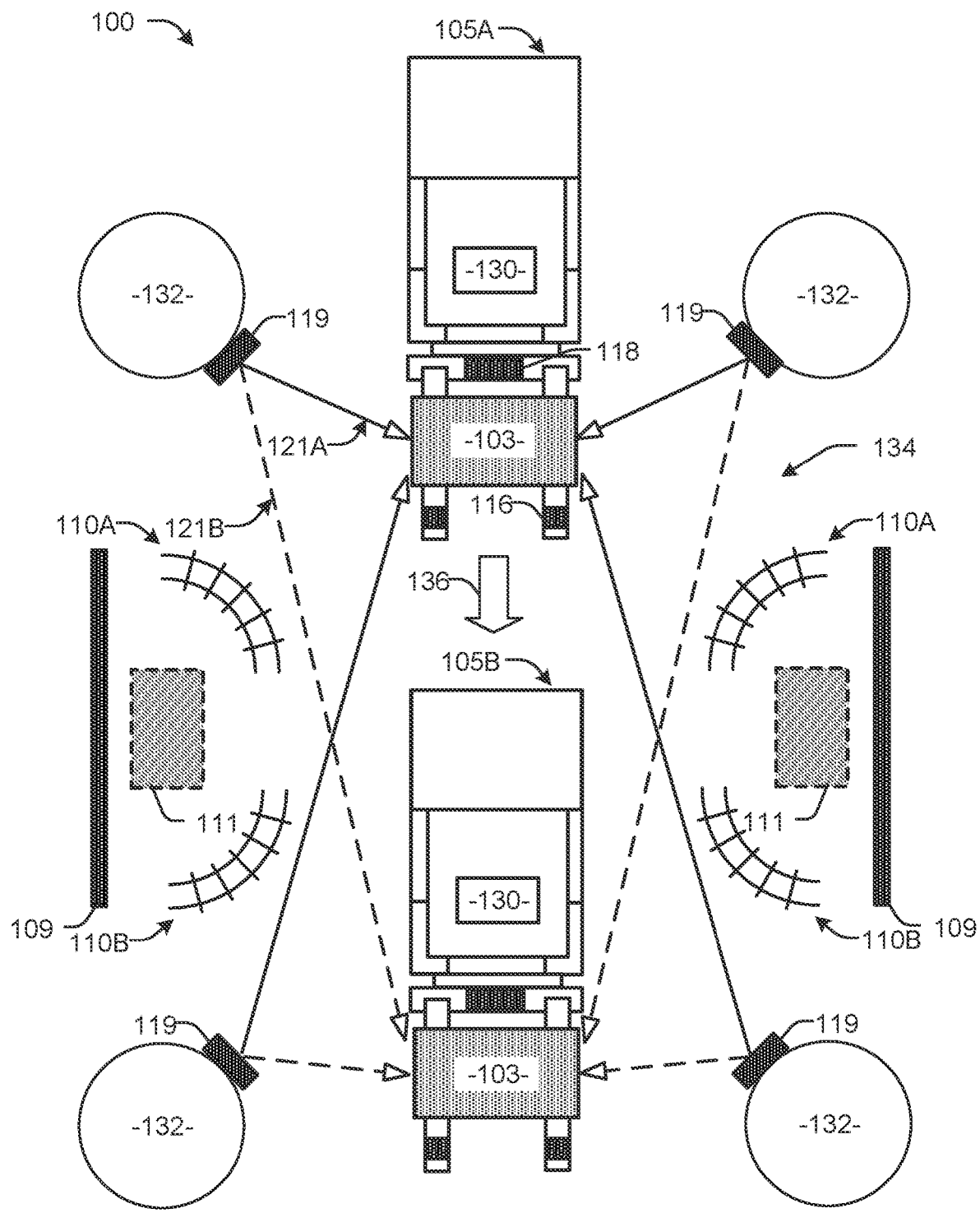
FIG. 2 illustrates a view of the example object dimensioning system of FIG. 1A within the predetermined area, in accordance with aspects of this disclosure.

FIG. 2 illustrates an example area wide dimensioning system 100 implementing an object dimensioning operation. As shown, a vehicle 105A enters an area 134 between four structures 132 (e.g., pillars, walls, ceiling mounts, etc.), upon which one or more sensors 119 are mounted.

In some examples, the structures 132 are in a fixed location within the area 134, whereas in other examples the structures 132 (and/or the individual sensors) are mobile. For instance, the structures 132 may be vehicles (e.g., other load handling vehicles, autonomous robotic sensors, drones, etc.) or other movable objects. Although illustrated in the example of FIG. 2 as locating the sensors 119 at four equally spaced positions, in some examples, any number of sensors, including a single sensor 119, may be used in the system, arranged in any position or orientation to effect a particular dimensioning operation.

A tracking device 130 may be mounted to one or more both of the object and/or vehicle. The tracking device 130 may be an indicator presented to the first or second sensors, a global position system, or a beacon transmitting a signal corresponding to the vehicle or the object. Information corresponding to the object's location can be received via one or more sensors and/or thought another system (e.g., GPS) operatively connected to the control circuitry 122.

As the object 103 enters the area (which may be informed by information from the tracking device 130), one or more of the sensors 119, 109, 111 (and/or sensors 116, 118) are activated to capture object data at a first time/location occupied by vehicle 105A via signals 121A and/or 110A. As the object 103 advances in direction 136, the sensors capture data at a second time/location occupied by vehicle 105B via signals 121B and/or 110B. Having captured data corresponding to one or more object dimensions, the sensor data is transmitted to the control circuitry 122 to generate a composite model 124 (e.g., shape, volume, orientation, or area) of the object 103.

Although first and second data capture events are illustrated as occurring at distinct times and/or locations, any number of data capture events may be conducted by any sensor, be it coordinated between sensors or independently, regardless of relative location or movement of the object 103.

Figure 3:
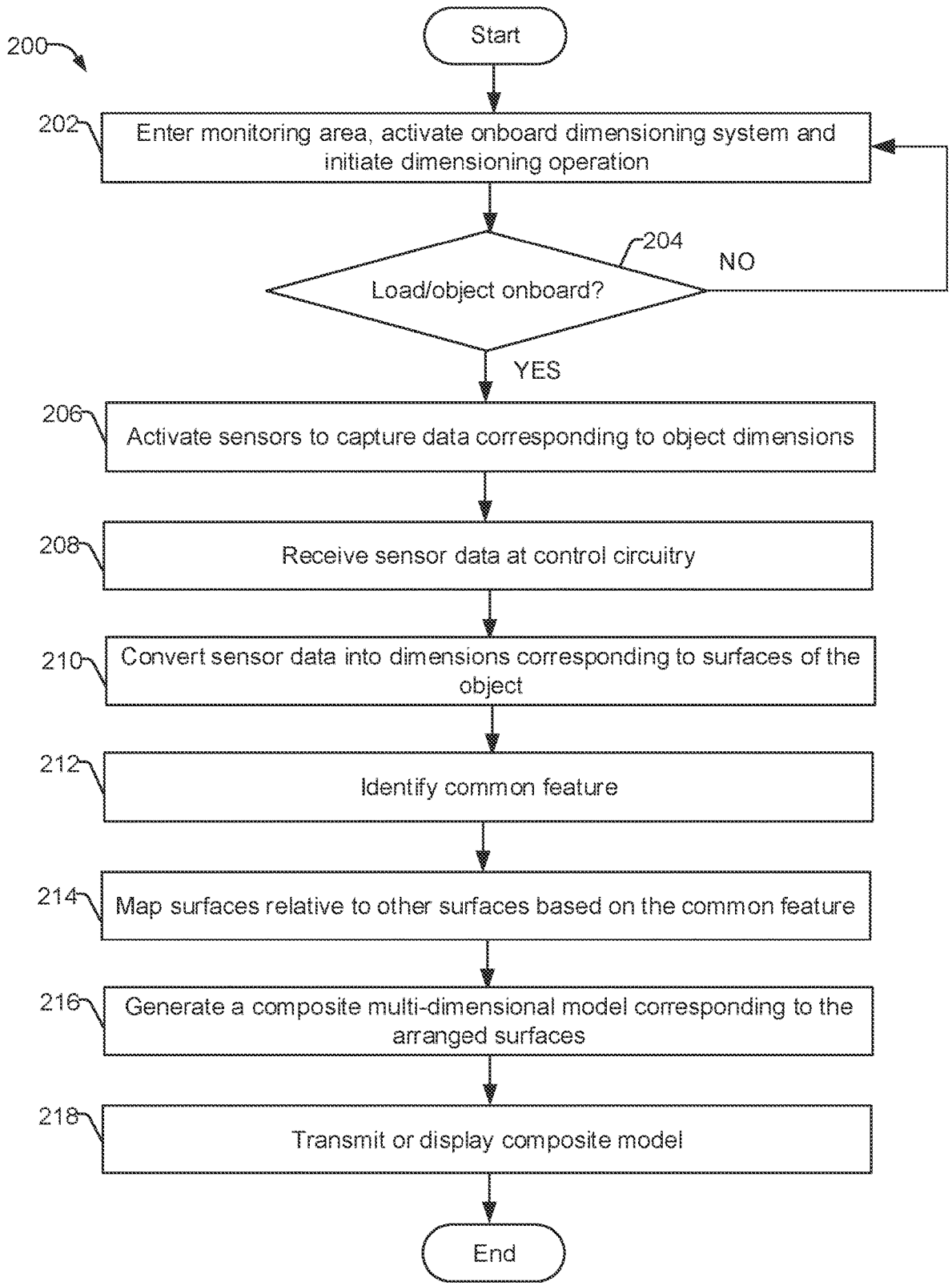
FIG. 3 illustrates an example flow chart of implementing an object dimensioning system within a predetermined area, in accordance with aspects of this disclosure.

FIG. 3 is a flowchart representative of the program 200. For example, the program 200 may be stored on a memory (e.g., memory circuitry 156) linked to processor (e.g., processor 150) as a set of instructions to implement an area wide dimensioning operation via associated circuitry (e.g., control circuitry 122), as disclosed herein.

At block 202, the object enters a monitoring area (e.g., a warehouse, loading dock, etc.) and, in response, the program 200 activates an area wide dimension system and initiates a dimensioning operation, such as in response to a user input (e.g., a command to initiate the operation), a sensor input (e.g., a motion and/or weight sensor), etc. At block 204, the program determines whether a load or object is present for imaging (e.g., rather than an operator, vehicle without a load, etc.). If no object is present, the program returns to block 202 and awaits instructions to proceed. If an object is present (e.g., verified by a motion sensor, a weight sensor, identification of a structural feature and/or marker representing the object, etc.), the program proceeds to block 206, where one or more sensors (e.g., sensors 109, 111, 116, 118, 119A, 119B) are activated to capture data corresponding to one or more dimensions of the object.

At block 208, the sensor data is transmitted from the sensors and received at the control circuitry, where it is converted into dimensions corresponding to surfaces of the object in block 210. At block 212, one or more common features of the object are identified. For example, the sensor data (from one or more sensors) may include the common feature (e.g., a measurable indicator such as a digital code or watermark), which can be used to map the surfaces from multiple views and/or sensors to generate a composite multi-dimensional model in block 216.

In some examples, the composite model is generated as a cuboid model, with data of one more dimensions of the various surfaces measured by the sensors. In particular, measurements from the sensors are stitched together, such as by reference to the common identifying feature. In some examples, an algorithm is applied to identify starts, stops, and/or voids of the surfaces, and/or to extrapolate to solidify the cuboidal model.

In some examples, the dimensions of the cuboid can be estimated to the nearest maximum dimension that is captured by the sensors and/or dimensioned by the control circuitry. For example, the control circuitry can determine endpoints of each of the one or more surfaces. The location of a greatest endpoint in one or more axes can be identified and used to generate a plane corresponding to each of six sides of a cuboid based on each greatest endpoint. The location and extent of the endpoints are then used to estimate a shape, volume, orientation, or area of the cuboid comprising the planes corresponding to each of the six axes As a composite model may incorporate several data sets, images, and/or perspectives, one or more of the surfaces may be used to build multiple models. As one or more of the models may lack detail (based on an estimated surface dimension), multiple models may be compiled to generate the composite model representing a best estimate of the objects dimensions. In some examples, when multiple surfaces (e.g., from multiple views and/or sensors) present conflicting surface dimensions, the dimension is used to estimate the shape, volume, orientation, or area of the object. This technique can be applied to each of six sides of the cuboid to generate the model.

In some examples, the object may be transported on a support or surface (such as a pallet), which can be used as additional data for generating a composite model. At block 218, the composite model can be transmitted to another system (e.g., remote computer 166) or presented to a user (e.g., via interface 154). The program may end, continue in a loop, and/or activate periodically to initiate a dimensioning operation.

In some examples the sensors 109, 111, 116, 118, 119A, 119B, operate in concert (e.g., the respective sensors are employed simultaneously, in turn, and/or measure a common surface and/or feature), such that measurements from each sensor may be provided to the processor 150 to calculate an accurate dimensions and/or a volume of the object 103. In some examples, the various sensors operate independently of the others. However, the control circuitry 122 is capable to stitch together a composite model based on one or more common features obtained by the sensors.

Figure 4:
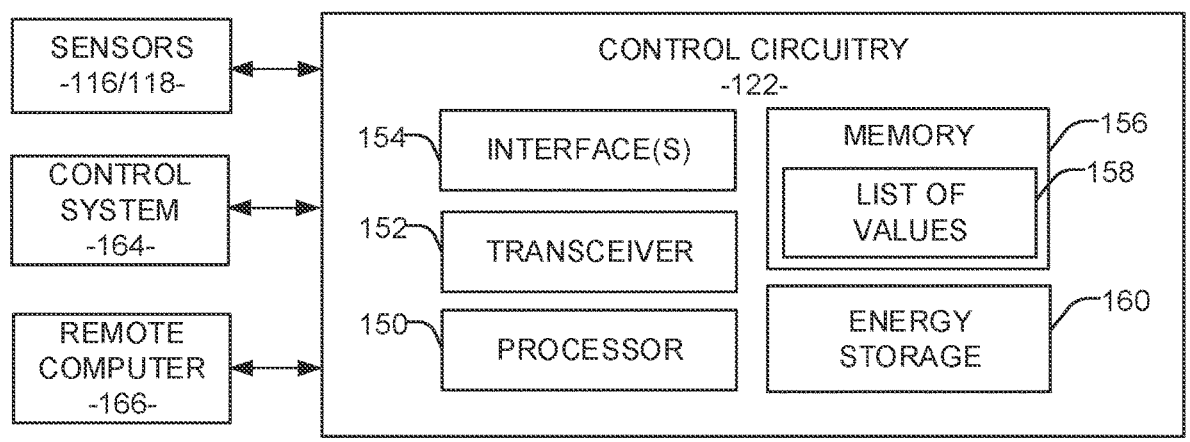
FIG. 4 is a diagrammatic illustration of an example control circuitry, in accordance with aspects of this disclosure.

As provided herein, sensor data corresponding to object dimensions is provided to the control circuitry 122 and/or another computing platform (e.g., remote computer or system 166) for analysis, display, recordation, display, etc. As shown in the example of FIG. 4, a processor 150 can be configured to receive and translate information from the one or more sensors 109, 111, 116, 118, 119A, 119B into a digital and/or computer readable format, for analysis (e.g., via processor 150), display to an operator (e.g., via an interface 154), to store in memory (e.g., memory storage device 156), and/or transmission to another computing platform 166, such as a remote computer and/or central repository. In some examples, the sensors 109, 111, 116, 118, 119A, 119B may include a wired and/or wireless transceiver to transmit information to another device for processing. The processor 150 that receives the output is capable of determining dimensions of one or more surfaces of the object base on sensor data received from the sensors 109, 111, 116, 118, 119A, 119B. The control circuitry 122 and/or the processor 150 is capable of executing computer readable instructions, and may be a general-purpose computer, a laptop computer, a tablet computer, a mobile device, a server, and/or any other type of computing device integrated or remote to the system 100. In some examples, the control circuitry 122 may be located remotely from the vehicle, and may be implemented in a cloud computing environment, on one or more physical machines, and/or on one or more virtual machines.

In examples, one or more of the sensors 109, 111, 116, 118, 119A, 119B are one or more of a radar system, an acoustic sensor, an image capture system, a laser based system, an acoustic sensor, a LIDAR system, or a microwave system, but can be some other type of sensor that provides desired sensitivity and accuracy. For example, the sensor(s) are configured to generate a signal representative of the object dimensions during a measuring operation and transmit that signal to a device configured to receive and analyze the signal.

For example, the sensor(s) 109, 111, 116, 118, 119A, 119B may be in communication with the processor 150 and/or other device to generate an output associated with a measured value (e.g., for display, to provide an audible alert, for transmission to a remote computing platform, for storage in a medium, etc.). The processor 150 is configured to parse analog or digital signals from the one or more sensors in order to generate the signal.

In some examples, the control circuitry is configured to compare the plurality of signal characteristics to a list associating signal characteristics to object dimensions, which can be used to calculate or estimate dimensions of the object. The control circuitry can additionally or alternatively compare the first or second dimensions to a list associating dimensions to one or more of a shape, a volume, an orientation, or an area of an object to calculate or estimate one or more dimensions of the object.

Generally, any number or variety of processing tools may be used, including hard electrical wiring, electrical circuitry, transistor circuitry, including semiconductors and the like.

In some examples, the memory storage device 156 may consist of one or more types of permanent and temporary data storage, such as for providing the analysis on sensor data and/or for system calibration. The memory 156 can be configured to store calibration parameters for a variety of parameters, such as sensor type. The historical measurement data can correspond to, for example, operational parameters, sensor data, a user input, as well as data related to trend analysis, threshold values, profiles associated with a particular measurement process, etc., and can be stored in a comparison chart, list, library, etc., accessible to the processor 150. The output from the processor 150 can be displayed graphically, such as the current dimension measurements, as a historical comparison, for instance. This process can be implemented to calibrate the system 100 (e.g., prior to implementing a dimensioning operation).

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

What is claimed is:

1. An object dimensioning system for a predetermined area comprising:
    a first sensor arranged at a first location of the predetermined area and configured to capture first data corresponding to one or more first features of the object as the object moves through the predetermined area;
    a second sensor arranged at a second location of the predetermined area and configured to capture second data corresponding to one or more second features of the object;
    a third sensor arranged at a third location of the predetermined area; and
    control circuitry configured to:
        receive location data of the object from a tracking device corresponding to the object;
        receive the first and second data corresponding to the first and second one or more features, respectively;
        convert the first and second data into first and second dimensions, respectively, corresponding to one or more surfaces of the object;
        determine a shape, volume, orientation, or area of the one or more surfaces of the object corresponding to the first and second dimensions;
        determine a predicted path of the object based on the location data, the first data, the second data, or any combination thereof to determine one or more pending arrival locations of the object; and
        upon determining that at least one of the one or more pending arrival locations are within a sensing area of the third sensor, sending an alert signal to the third sensor.

2. The object dimensioning system of claim 1, wherein the control circuitry is further configured to:
    calculate or estimate a first measurement of the object based on the first data, wherein the first measurement comprises at least one of a first shape, volume, orientation, or area;
    calculate or estimate a second measurement of the object based on the second data, wherein the second measurement comprises at least one of a second shape, volume, orientation, or area;
    map the first shape, volume, orientation, or area of the object to the second shape, volume, orientation, or area of the object; and
    generate a composite shape, volume, orientation, or area of the object based on the first and second measurements.

3. The object dimensioning system of claim 2, wherein the control circuitry is further configured to:
    identify a common features in the first data and the second data; and
    link the first shape, volume, orientation, or area of the object to the second shape, volume, orientation, or area of the object based on a position or orientation of the common feature to generate the composite shape, volume, orientation, or area of the object.

4. The object dimensioning system of claim 2, wherein the control circuitry is further configured to generate a multi-dimensional model of the composite shape, volume, orientation, or area of the object.

5. The object dimensioning system of claim 1, wherein the object is loaded on a moving vehicle.

6. The object dimensioning system of claim 1, wherein the first or the second sensor is mounted to a vehicle supporting the object.

7. The object dimensioning system of claim 1, wherein the tracking device is arranged on a vehicle supporting the object.

8. The object dimensioning system of claim 1, wherein the tracking device is arranged on the object.

9. The object dimensioning system of claim 1, wherein the tracking device is one or more of a global position system, an indicator presented to the first or second sensors, or a beacon transmitting a signal corresponding to a vehicle supporting the object or the object.

10. The object dimensioning system of claim 1, wherein the first or second sensor is configured to monitor the tracking device.

11. The object dimensioning system of claim 1, wherein the first or second sensors are one or more of an image capture systems, a radar system, a laser based system, an acoustic sensor, a LIDAR system, a microwave system, or a combination thereof.

12. The object dimensioning system of claim 11, wherein the first and second sensors are the same type of sensor.

13. The object dimensioning system of claim 11, wherein the first and second sensors are different types of sensor.

14. The object dimensioning system of claim 1, wherein the one or more first and second features are one or more of a size, a shape, an angle, or an orientation of the object.

15. The object dimensioning system of claim 1, wherein the third sensor is configured to:
    capture third data corresponding to one or more third features of the object when the object is within an active sensing portion of the sensing area, the active sensing portion being defined at least in part by an orientation of the third sensor;
    upon receiving the alert signal, determine whether the one or more pending arrival locations within the sensing area are within the active sensing portion of the sensing area based on an initial orientation of the third sensor; and
    upon determining that the one or more pending arrival locations within the sensing area are not within the active sensing portion of the sensing area, reorient from the initial orientation to a modified orientation to modify the active sensing portion of the sensing area to capture a third data corresponding to one or more third features of the object.

16. The object dimensioning system of claim 1, wherein:
    the first sensor is further configured to capture the first data when the object is within a first sensing area of the first sensor;
    the second sensor is further configured to capture the second data when the object is within a second sensing area of the second sensor; and
    the sensing area of the third sensor is a third sensing area that does not include any of the first sensing area and does not include any of the second sensing area.

17. The object dimensioning system of claim 1, wherein:
the control circuitry is further configured to determine a speed and an orientation of the object based on the location data, the first data, the second data, or any combination thereof; and
the determining of the predicted path of the object and the determining of the one or more pending arrival locations of the object are based on the speed and the orientation of the object.

18. An object dimensioning system for a predetermined area comprising:
a first sensor arranged at a first location of the predetermined area and configured to capture first data corresponding to one or more first features of the object as the object moves through the predetermined area, wherein:
the first sensor comprises one or more radar sensors, one or more acoustic sensors, or any combination thereof, and
the first sensor captures the first data from one or more feedback signals comprising a plurality of signal characteristics, the plurality of signal characteristics comprising one or more of time of flight data, Doppler shift data, or angle of arrival data;
a second sensor arranged at a second location of the predetermined area and configured to capture second data corresponding to one or more second features of the object, wherein the one or more first and second features are one or more of a size, a shape, an angle, or an orientation of the object;
a third sensor arranged at a third location of the predetermined area; and
control circuitry configured to:
receive location data of the object from a tracking device corresponding to the object;
receive the first and second data corresponding to the first and second one or more features, respectively;
convert the first and second data into first and second dimensions, respectively, corresponding to one or more surfaces of the object;
identify one or more common features of the first and second one or more features based on the first and second data;
generate one or more composite dimensions of the one or more surfaces of the object by mapping the one or more surfaces from at least some of the first dimensions and at least some of the second dimensions based on the one or more common features;
determine a composite shape, volume, orientation, or area of each the one or more surfaces of the object;
generate a multi-dimensional model of the object, the multi-dimensional model comprising the composite shape, volume, orientation, or area of each of the one or more surfaces of the object;
determine a predicted path of the object based on the location data, the first data, the second data, or any combination thereof to determine one or more pending arrival locations of the object; and
upon determining that at least one of the one or more pending arrival locations are within a sensing area of the third sensor, sending an alert signal to the third sensor.

19. The object dimensioning system of claim 18, wherein the tracking device is arranged on one or both of a vehicle supporting the object or on the object.

20. An object dimensioning system for a predetermined area comprising:
a first sensor arranged at a first location of the predetermined area and configured to capture first data corresponding to one or more first features of the object as the object moves through the predetermined area;
a second sensor arranged at a second location of the predetermined area and configured to capture second data corresponding to one or more second features of the object, wherein the one or more first and second features are one or more of a size, a shape, an angle, or an orientation of the object;
a third sensor arranged at a third location of the predetermined area; and
control circuitry configured to:
receive location data of the object from a tracking device corresponding to the object;
receive the first and second data corresponding to the first and second one or more features, respectively;
convert the first and second data into first and second dimensions, respectively, corresponding to one or more surfaces of the object;
determine a shape, an orientation, and an area of the one or more surfaces of the object corresponding to the first and second dimensions;
generate a multi-dimensional model of the object, wherein:
the multi-dimensional model comprises the shape, the orientation, and the area of each of the one or more surfaces of the object; and
the multi-dimensional model defines a complex geometry;
determine a predicted path of the object based on the location data, the first data, the second data, or any combination thereof to determine one or more pending arrival locations of the object; and
upon determining that at least one of the one or more pending arrival locations are within a sensing area of the third sensor, sending an alert signal to the third sensor.

* * * * *